United States Patent
Li et al.

(10) Patent No.: US 9,215,080 B2
(45) Date of Patent: Dec. 15, 2015

(54) ADAPTIVE BIT RATE DISTRIBUTION OF MULTICAST STREAMS

(71) Applicant: Broadcom Corporation, Irvine, CA (US)

(72) Inventors: Yong Li, San Diego, CA (US); Xuemin Chen, Rancho Sante Fe, CA (US); Rajesh Shankarrao Mamidwar, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 239 days.

(21) Appl. No.: 13/928,248

(22) Filed: Jun. 26, 2013

(65) Prior Publication Data

US 2014/0355603 A1 Dec. 4, 2014

Related U.S. Application Data

(60) Provisional application No. 61/830,000, filed on May 31, 2013.

(51) Int. Cl.
*H04L 12/18* (2006.01)

(52) U.S. Cl.
CPC .................................... *H04L 12/184* (2013.01)

(58) Field of Classification Search
None
See application file for complete search history.

(56) References Cited

U.S. PATENT DOCUMENTS

| | | | |
|---|---|---|---|
| 6,961,432 B1 * | 11/2005 | Sinha et al. | 381/2 |
| 8,205,004 B1 * | 6/2012 | Kaufman et al. | 709/231 |
| 8,473,630 B1 * | 6/2013 | Galligan | 709/231 |
| 2010/0235438 A1 * | 9/2010 | Narayanan et al. | 709/203 |
| 2011/0119395 A1 * | 5/2011 | Ha et al. | 709/231 |
| 2013/0064283 A1 * | 3/2013 | Sun et al. | 375/240.01 |
| 2013/0159388 A1 * | 6/2013 | Forsman et al. | 709/203 |
| 2014/0050082 A1 * | 2/2014 | Sun et al. | 370/230 |
| 2014/0189765 A1 * | 7/2014 | Green | 725/110 |

* cited by examiner

*Primary Examiner* — Brian Roberts
(74) *Attorney, Agent, or Firm* — McDermott Will & Emery LLP

(57) ABSTRACT

A system for adaptive bit rate distribution of multicast streams may include one or more processors and a memory. The one or more processors may be configured to identify streams, such as multicast streams, transmitted by a content delivery network. The streams may each contain a content item that is encoded at a different bit rate for each stream. The one or more processors may determine segments of the streams, for example based on time stamps associated with the content item or markers of the streams. The one or more processors may transmit a first segment of a first stream encoded at a first bit rate to a user device in response to a request therefor and, upon completing the transmission of the first segment, transmit a second segment of a second stream encoded at a second bit rate to the user device in response to a request therefor.

20 Claims, 6 Drawing Sheets

ADAPTIVE BIT RATE DISTRIBUTION OF MULTICAST STREAMS

CROSS-REFERENCE TO RELATED APPLICATIONS

The present application claims the benefit of U.S. Provisional Patent Application Ser. No. 61/830,000, entitled "Adaptive Bit Rate Distribution of Multicast Streams," filed on May 31, 2013, which is hereby incorporated by reference in its entirety for all purposes.

TECHNICAL FIELD

The present description relates generally to adaptive bit rate distribution, and more particularly, but not exclusively, to adaptive bit rate distribution of multicast streams.

BACKGROUND

In an adaptive bit rate streaming system, a content item is encoded into multiple streams of different bit rates, with each stream being divided into sequential segments of a given duration (e.g. 2-10 seconds). A manifest file is transmitted to user devices, e.g. by an adaptive bit rate server, that lists the segments of the content item, the different bit rates at which each segment has been encoded, and a network identifier for accessing each segment, e.g. a uniform resource locator (URL). A user device may retrieve each segment at the bit rate that is appropriate for the user device, e.g. based on network bandwidth conditions and device capabilities that are determinable by the user device. In this manner, the user device may adaptively retrieve segments that are encoded at different bit rates in accordance with changing network bandwidth conditions. However, although many user devices may be capable of adaptive bit rate streaming, there may be legacy content delivery networks that do not have adaptive bit rate streaming capabilities.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
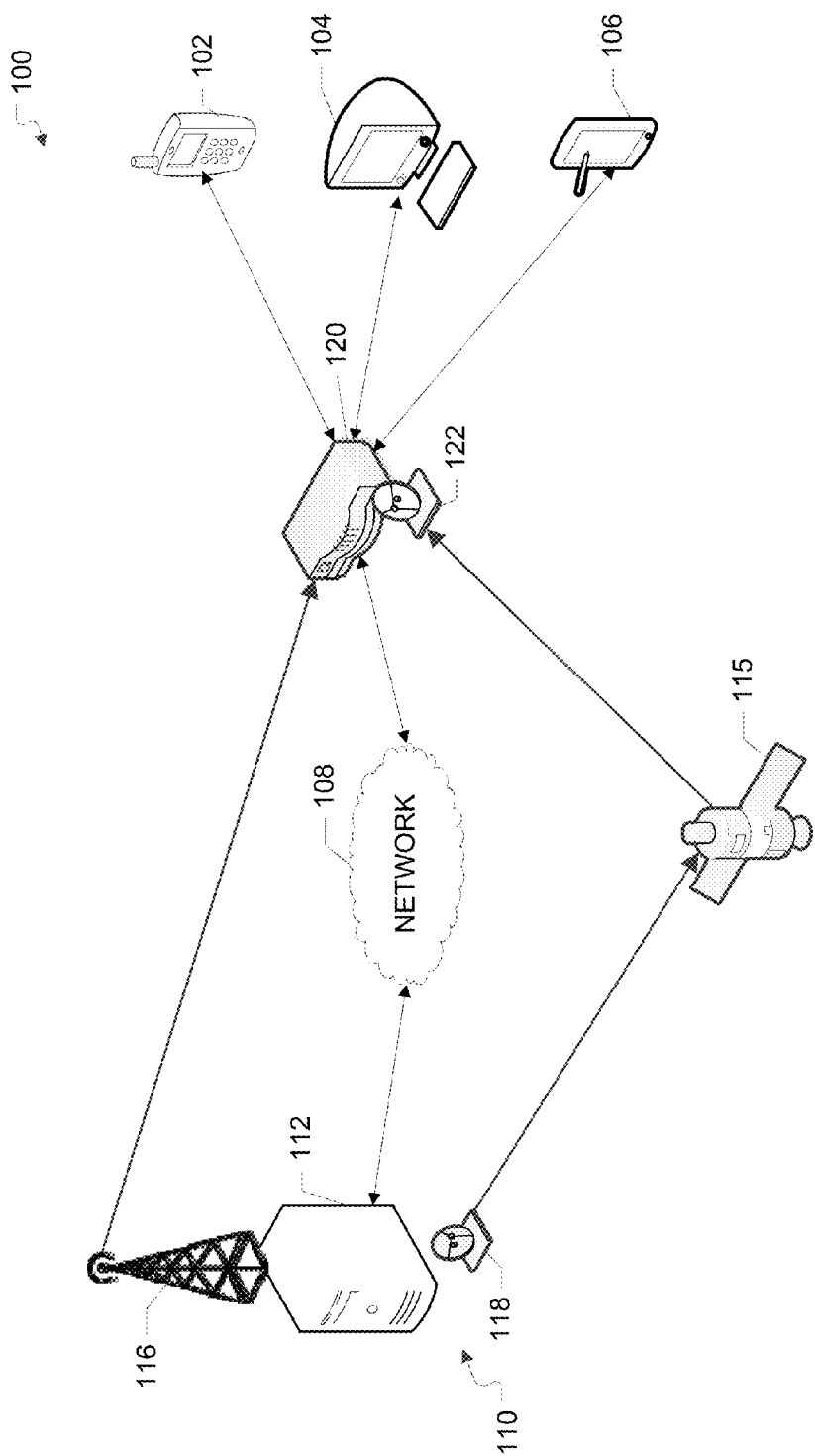
FIG. 1 illustrates an example network environment in which a system for adaptive bit rate distribution of multicast streams may be implemented in accordance with one or more implementations.

FIG. 1 illustrates an example network environment 100 in which a system for adaptive bit rate distribution of multicast streams may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a content delivery network (CDN) 110 that is communicably coupled to a gateway device 120, such as by a network 108. The example network environment 100 further includes one or more electronic devices 102, 104, 106 that are communicably coupled to the gateway device 120. The CDN 110 may include, and/or may be communicably coupled to, a content server 112, an antenna 116 for transmitting streams, such as data streams, over the air, and a satellite transmitting device 118 that transmits streams to a satellite 115. The gateway device 120 may include, and/or may be coupled to, a satellite receiving device 122, such as a satellite dish, that receives streams, such as data streams, from the satellite 115. In one or more implementations, the gateway device 120 may further include an antenna for receiving streams over the air from the antenna 116. The content server 112, the gateway device 120, and/or any of the electronic devices 102, 104, 106, may be, or may include, one or more components of the electronic system discussed below with respect to FIG. 6.

The network 108 may be a public communication network (such as the Internet, cellular data network, dialup modems over a telephone network) or a private communications network (such as private local area network ("LAN"), leased lines). The network 108 may also include, but is not limited to, any one or more of the following network topologies, including a bus network, a star network, a ring network, a mesh network, a star-bus network, a tree or hierarchical network, and the like. In one or more implementations, the network 108 may include a hybrid fiber-coaxial (HFC) network that communicatively couples the content server 112 and the gateway device 120.

The CDN 110 may utilize Data Over Cable Service Interface Specification (DOCSIS) to provide high-speed data transfer, in addition to multimedia content, to the gateway device 120 over the HFC network. The CDN 110 may transmit streams that include content items, such as television programs, movies, or generally any multimedia content, via the network 108, the antenna 116, and/or the satellite 115. For example, the CDN 110 may transmit Internet Protocol (IP) streams, such as unicast, multicast, or broadcast streams, that include content items over the network 108 and the CDN 110 may transmit QAM-modulated and/or multiplexed streams that include content items via the HFC network, the antenna 116 and/or the satellite 115, e.g. through the satellite transmitting device 118. In one or more implementations, the CDN 110 may be representative of multiple disparate content delivery networks that are configured to transmit streams to the gateway device 120 and/or the electronic devices 102, 104, 106. In one or more implementations, any of the streams transmitted by the CDN 110 may be a transport stream that includes transport packets, such as an MPEG transport stream.

The content server 112 may include, or may be coupled to, one or more processing devices and/or a data store. The one or more processing devices execute computer instructions stored in the data store, for example, to implement a content delivery network. The data store may store the computer instructions on a non-transitory computer-readable medium. The data store may further store one or more content items that are delivered by the CDN 110. In one or more implementations, the content server 112 may be a single computing device such as a computer server. Alternatively, the content server 112 may represent multiple computing devices that are working together to perform the actions of a server computer (such as a cloud of computers and/or a distributed system). The content server 112 may be coupled with various databases, storage services, or other computing devices, that may be collocated with the content server 112 or may be disparately located from the content server 112.

The electronic devices 102, 104 and 106 can be computing devices such as laptop or desktop computers, smartphones, personal digital assistants ("PDAs"), portable media players, set-top boxes, tablet computers, televisions or other displays with one or more processors coupled thereto and/or embedded therein, or other appropriate computing devices that can be used for adaptive bit rate streaming, and rendering, of multimedia content and/or can be coupled to such a device. In the example of FIG. 1, the electronic device 102 is depicted as a smart phone, the electronic device 104 is depicted as a desktop computer, and the electronic device 106 is depicted as a tablet device. In one or more implementations, any of the electronic devices 102, 104, 106 may be referred to as a user device.

The gateway device 120 may include a network processor or a network device, such as a switch or a router, that is configured to couple the electronic devices 102, 104, 106 to the content server 112 and/or to the network 108. In one or more implementations, the gateway device 120 may be, or may include, a set-top box, e.g. a device that is coupled to a display, such as a television, and is capable of rendering multimedia content on the display. The gateway device 120 may receive streams from the CDN 110 that include content items, such as television programs, movies, or generally any content items. The gateway device 120 may receive the streams from the CDN 110 via the antenna 116, via the network 108, and/or via the satellite 115.

For example, the gateway device 120 may receive multicast streams from the CDN 110 via the network 108 and multiplexed streams and/or modulated streams from the CDN 110 via the antenna 116 and/or the satellite 115. The modulated streams may be modulated with QAM, PSK, APSK, QPSK, or generally any modulation scheme. In one or more implementations, the gateway device 120 may be coupled to the CDN 110 via a HFC network and the gateway device 120 may receive multiplexed and/or modulated streams from the CDN 110 via the HFC network. In one or more implementations, any of the streams received by the gateway device 120 may be a transport stream that includes transport packets, such as an MPEG transport stream.

The gateway device 120 may further include an adaptive bit rate server, such as a lightweight adaptive bit rate server, that is configured to provide adaptive bit rate streaming to the electronic devices 102, 104, 106 with respect to content items received from the CDN 110, e.g. via the multicast streams and or the multiplexed streams. For example, the CDN 110 may be unable to provide adaptive bit rate streaming for one or more of the content items transmitted via the multicast streams and/or the multiplexed streams, e.g. due to technological and/or economic constraints. However, the CDN 110 may be able to simultaneously transmit multicast streams and/or multiplexed streams that carry different versions of the same content item, e.g. versions having different bit rates, different frame rates, different resolutions, different codecs, etc. The gateway device 120 may determine the received multicast and/or multiplexed streams that include the same content item, e.g. through guide or channel information provided by the CDN 110, through header information included in the streams, and/or by comparing the underlying video frames, or groups of pictures (GOP) of the streams. The gateway device 120 may also determine the different encoding characteristics for the streams that contain the content item, such as bit rate, frame rate, resolution, codec, etc.

Since the multicast streams and multiplexed streams are not segmented, e.g. separated into segments corresponding to a given duration of the underlying content item carried by the streams, the gateway device 120 may identify and/or determine the segments of the streams. In order for the adaptive bit rate streaming to provide for seamless streaming, the segments of one stream should correspond to the same portions of the content item as the segments of another stream. The CDN 110 may facilitate the segmenting process by inserting markers in the streams that carry the content item. The markers may indicate the start of a segment and may include sequence numbers that identify the segments. In one or more implementations, the markers may be inserted into the stream as separate packets or as part of the headers of existing packets in the stream. However, if the streams do not include markers, the gateway device 120 may determine segments the streams based on time stamps associated with the content item, such as the presentation time stamps (PTSs) in an MPEG transport stream. In one or more implementations, the PTS may be a metadata field in an MPEG transport stream that is used to synchronize video and audio streams when rendered to a viewer. The PTS may be given in units relative to a clock reference, such as a program clock reference (PCR) or a system clock reference (SCR). An example process for identifying segments of received streams is discussed further below with respect to FIG. 4.

After determining the encoding characteristics of the streams that contain the content item, and the segments of each stream, the gateway device 120 may generate a manifest file that lists the segments and the different bit rates (or other encoding characteristics) for which the segments are available, along with an associated URL for accessing the segments. The URL may be hosted by the gateway device 120, such that the gateway device 120 transmits the associated segment when a request for the URL is received. In one or more implementations, the gateway device 120 may transcode one or more of the streams to generate additional versions of the content item, and the gateway device 120 may add the additional versions to the manifest file.

The gateway device 120 transmits the manifest file to the electronic devices 102, 104, 106. The electronic devices 102, 104, 106 may retrieve each segment of the content item from the gateway device 120, e.g. via the URL listed in the manifest file, at the bit rate that is appropriate for the electronic devices 102, 104, 106, respectively, e.g. based on network bandwidth conditions and device capabilities that are determinable by the electronic devices 102, 104, 106, respectively. The electronic devices 102, 104, 106, may render the received segments in sequence, e.g. on a display, in order to reproduce the content item. Thus, the gateway device can provide adaptive bit rate streaming to the electronic devices 102, 104, 106, for a content item that is transmitted without adaptive bit rate streaming by the CDN 110. An example process of providing adaptive bit rate streaming of multicast and/or multiplexed streams is discussed further below with respect to FIG. 4.

Figure 2:
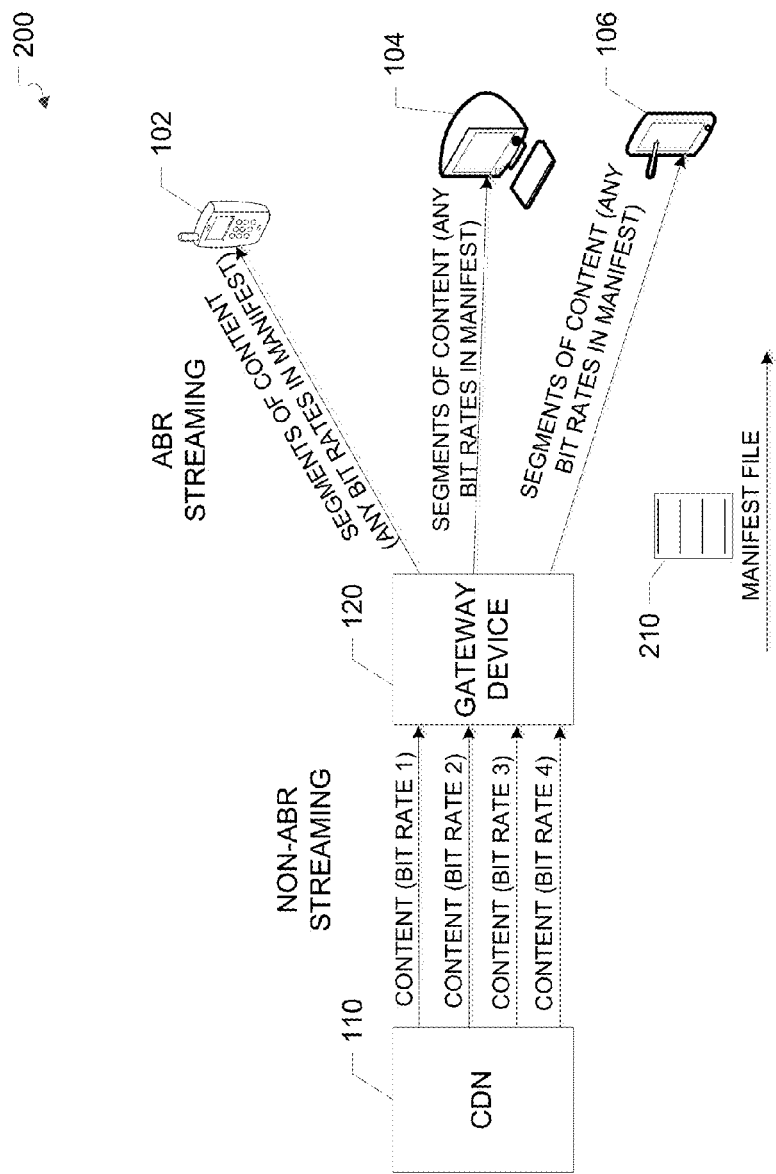
FIG. 2 illustrates an example content flow of a system for adaptive bit rate distribution of multicast streams in accordance with one or more implementations.

FIG. 2 illustrates an example content flow 200 of a system for adaptive bit rate distribution of multicast streams in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

In the content flow 200, the CDN 110 transmits streams that include a content item encoded using different encoding parameters, such as different bit rate, resolution, frame rate, using a different codec, or generally any encoding parameters. For example, in the content flow 200, the CDN 110 transmits streams that contain the content item encoded at four different bit rates. The streams may be transmitted by the CDN 110 as multicast streams, e.g. over the network 108, and/or as multiplexed and/or modulated streams, e.g. via the antenna 116, the satellite 115, and/or a HFC network.

The gateway device 120 receives the streams that include the content item encoded with different encoding parameters. The gateway device 120 determines the encoding parameters associated with the different streams, identifies segments of the different streams, and generates a manifest file 210 that lists the segments, the encoding parameters, and URLs for accessing the segments. In one or more implementations, the CDN 110 may provide information, such as control information or guide information, to the gateway device 120 that identifies the various streams that contain the content item along with the encoding parameters corresponding to each stream.

The gateway device 120 transmits the manifest file 210 to the electronic devices 102, 104, 106. The gateway device 120 may generate and transmit an updated manifest file 210 on a periodic basis. The electronic devices 102, 104, 106 may request segments of any of the streams that contain the content item, e.g. the electronic devices 102, 104, 106 may request any version of the content item listed in the manifest file 210. The gateway device 120 transmits the requested segments to the electronic devices 102, 104, 106. Thus, the gateway device 120 enables adaptive bit rate streaming of the content item that is transmitted over multicast and/or multiplexed streams by the CDN 110.

Figure 3:
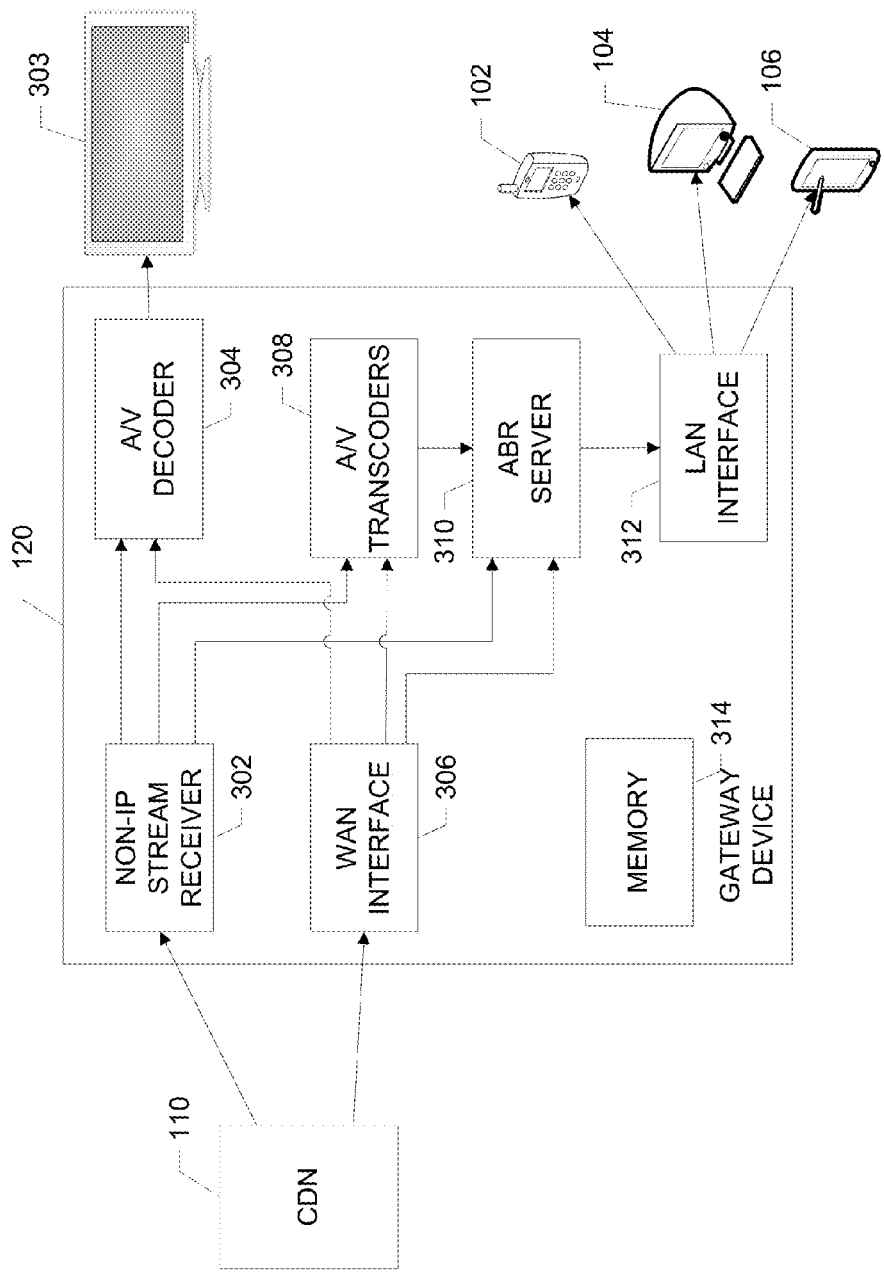
FIG. 3 illustrates an example gateway device that may be used in a system for adaptive bit rate distribution of multicast streams in accordance with one or more implementations.

FIG. 3 illustrates an example gateway device 120 that may be used in a system for adaptive bit rate distribution of multicast streams may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The gateway device 120 includes a non-IP stream receiver 302, an audio/video (A/V) decoder 304, a wide area network (WAN) interface 306, one or more A/V transcoders 308, an adaptive bit rate (ABR) server 310, a local area network (LAN) interface 312 and memory 314. The non-IP stream receiver 302 may be representative of multiple distinct receiver circuitry of the gateway device 120 and/or of receiver devices that are communicatively coupled to the gateway device 120, that allow the gateway device 120 to receive content-carrying streams from the CDN 110. For example, the non-IP stream receiver 302 may be coupled to the satellite receiving device 122 for receiving multiplexed streams from the CDN 110 via the satellite 115, the non-IP stream receiver may be coupled to an antenna for receiving multiplexed streams from the antenna 116, and/or the non-IP stream receiver may include circuitry for receiving multiplexed streams over a coaxial transmission network.

The WAN interface 306 may communicatively couple the gateway device 120 to the CDN 110 via the network 108. The gateway device 120 may receive IP streams, such as unicast and/or multicast streams, from the CDN 110 via the WAN interface 306. The A/V decoder 304 is configured to decode any of the received streams and render the content items carried by the streams on a display 303, such as a television, that is communicatively coupled to the gateway device 120. The A/V transcoders 308 are configured to transcode one or more received streams, e.g. to generate additional versions of a content item, such as at bit rates that may be desirable for one or more of the electronic devices 102, 104, 106.

The memory 314 may be configured to buffer, or store, one or more received streams and/or one or more segments of received streams, e.g. for transmission to the electronic devices 102, 104, 106. The memory 314 may also store associations between segments of streams and time stamps and/or markers. The LAN interface 312 may communicatively couple the gateway device 120 to the electronic devices 102, 104, 106. The LAN interface 312 may also communicatively couple the electronic devices 102, 104, 106 to the network 108 and/or the CDN 110, e.g. via the WAN interface 306.

The ABR server 310 may be configured to receive streams from the non-IP stream receiver 302 and the WAN interface 306 and identify the streams that include the same content item. The ABR server 310 may determine the encoding parameters of the respective streams, identify the segments of the streams, and generate a manifest file that lists the encoding parameters and the available segments. The ABR server 310 may transmit the manifest file to the electronic devices 102, 104, 106 via the LAN interface 312 and may provide requested segments to the electronic devices 102, 104, 106 via the LAN interface 312.

Figure 4:
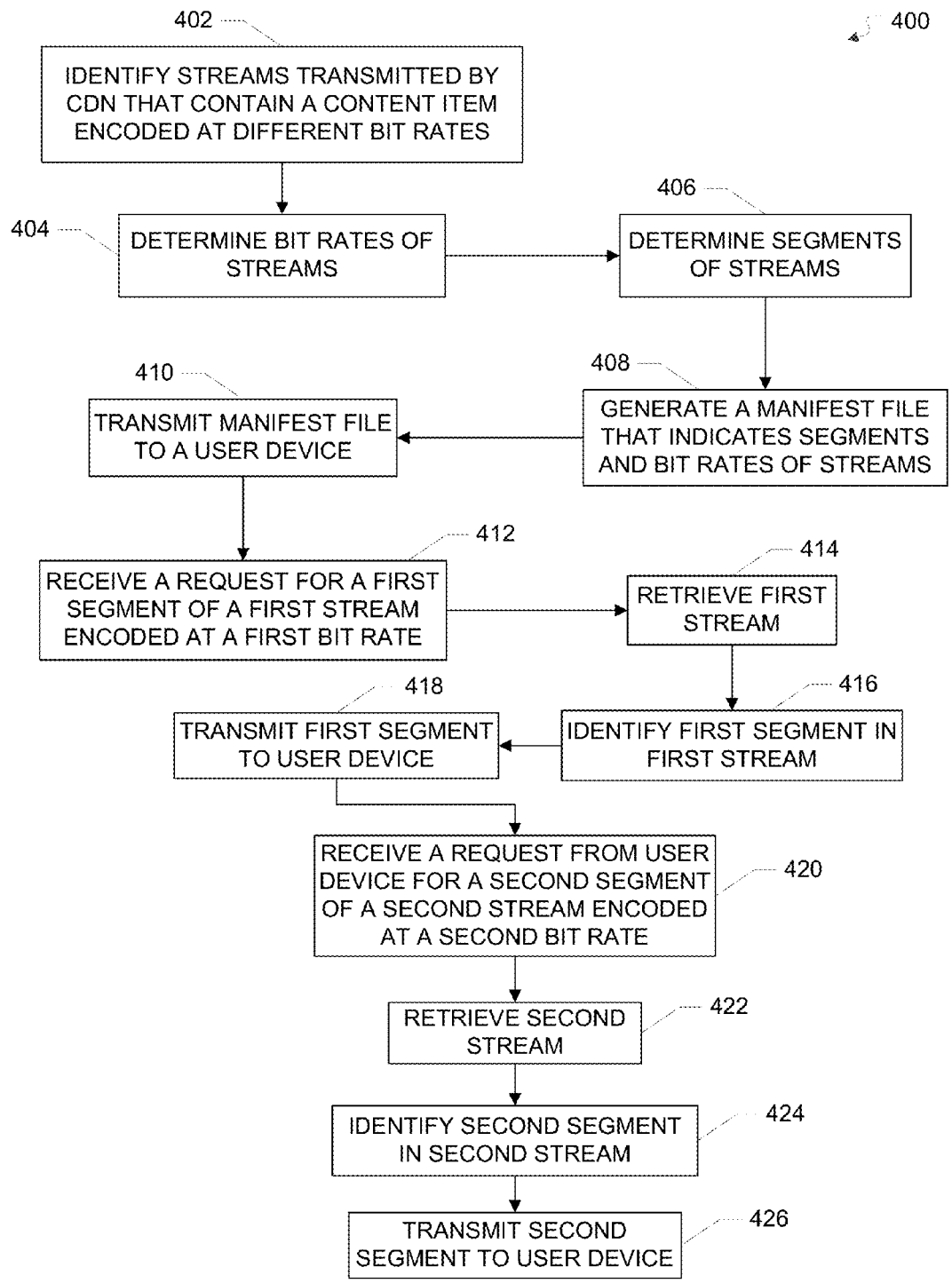
FIG. 4 illustrates a flow diagram of an example process of a system for adaptive bit rate distribution of multicast streams in accordance with one or more implementations.

FIG. 4 illustrates a flow diagram of an example process 400 of a system for adaptive bit rate distribution of multicast streams in accordance with one or more implementations. For explanatory purposes, the example process 400 is described herein with reference to the gateway device 120 of FIGS. 1-3; however, the example process 400 is not limited to the gateway device of FIGS. 1-3, and the example process 400 may be performed by one or more other components of the gateway device 120. Further for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed.

The gateway device 120 identifies streams, such as multicast streams and/or multiplexed streams, transmitted by the CDN 110 that contain the same content item, such as television program, but are encoded at different bit rates (402). For example, the gateway device 120 may identify a first stream, such as a multicast stream, and a second stream, such as a multiplexed stream, that contain the content item. In one or more implementations, the CDN 110 may transmit guide information, or directory information, to the gateway device 120 that identifies the streams that contain the content item. Alternatively, or in addition, the CDN 110 may insert headers into the streams that may be used to identify the content carried by the streams.

The gateway device 120 determines the bit rates at which the streams are encoded (404). For example, the first stream may be encoded at a first bit rate and the second stream may be encoded at a second bit rate. In one or more implementations, the bit rates of the streams may be included in the aforementioned guide information and/or may be included in the aforementioned headers, or the gateway device 120 may determine the bit rates by processing a portion of each stream. In one or more implementations, the content items carried by the streams may also differ with respect to other encoding parameters, such as frame rate, resolution, codec, etc., which may also be determined by the gateway device 120.

The gateway device 120 determines one or more segments of the streams (406), e.g. for listing in a manifest file. In one or more implementations, the gateway device 120 determines the segments of the streams based on markers inserted in the streams by the CDN 110 and/or based on time stamps associated with the content item carried by the streams. For example, the gateway device 120 may determine segments that correspond to portions of a stream that will be received a determined amount of time in the future, such as based on markers and/or time stamps of received portions of the stream. The gateway device 120 may store, in the memory 314, an association between the segments and identifiers of the markers and/or time stamps that indicate the start and/or end of the segments, e.g. the segment boundaries. In this manner the gateway device 120 can identify the markers and/or time stamps that indicate the boundaries of a segment requested by an electronic device 102. An example process for determining the segments of the streams is discussed further below with respect to FIG. 5.

The gateway device 120 generates a manifest file that indicates the segments of the streams, such as the first stream and the second stream, that are available, or that will be available, e.g. when requested, and the bit rates associated with the streams, such as the first bit rate and the second bit rate, and/or any other encoding parameters associated with the streams (408). The gateway device 120 transmits the manifest file to a user device, such as the electronic device 102 (410). In one or more implementations, the gateway device 120 may generate and transmit an updated manifest file on a periodic basis.

The gateway device 120 receives a request for a first segment of the first stream that is encoded at the first bit rate from a user device, such as the electronic device 102 (412). For example, the gateway device 120 may receive a hypertext transfer protocol (HTTP) request for the URL listed in the manifest file with respect to the first segment. The gateway device 120 may retrieve, or acquire, the first stream (414), e.g., by tuning to an appropriate frequency for receiving a stream via the antenna 116, retrieving a multicast stream via the network 108, demultiplexing a multiplexed stream, or generally any manner of retrieving, or acquiring the first stream corresponding to the request segment. In one or more implementations, the requested first segment may have been received and buffered in the memory 314, in which case the gateway device 120 may not need to acquire or retrieve the first stream.

The gateway device 120 identifies the first segment within the first stream (416), e.g. based at least in part on time stamps associated with the content item, such as presentation time stamps, and/or markers inserted into the streams by the CDN 110. For example, the gateway device 120 may retrieve identifiers of the markers and/or time stamps that form the boundaries of the segment in the first stream. The gateway device 120 retrieves the first segment from the first stream and transmits the first segment to the user device that requested the segment (418), such as the electronic device 102. In one or more implementations, the user device may receive and render the segment, may determine that the bit rate is too high or too low, and may request a second segment of a second stream that is encoded at a different bit rate than the first stream.

The gateway device 120 receives a request from the user device, such as the electronic device 102, for a second segment of a second stream that is encoded at a second bit rate (420). The gateway device 120 may retrieve, or acquire, the second stream (422), e.g. as previously discussed with respect to retrieving or acquiring the first stream. The gateway device 120 identifies the second segment within the second stream (424), e.g. as previously discussed with respect to identifying the first segment within the first stream. The gateway device 120 transmits the second segment of the second stream to the user device that requested the second segment, such as the electronic device 102, upon completing the transmission of the first segment to the user device (426).

Figure 5:
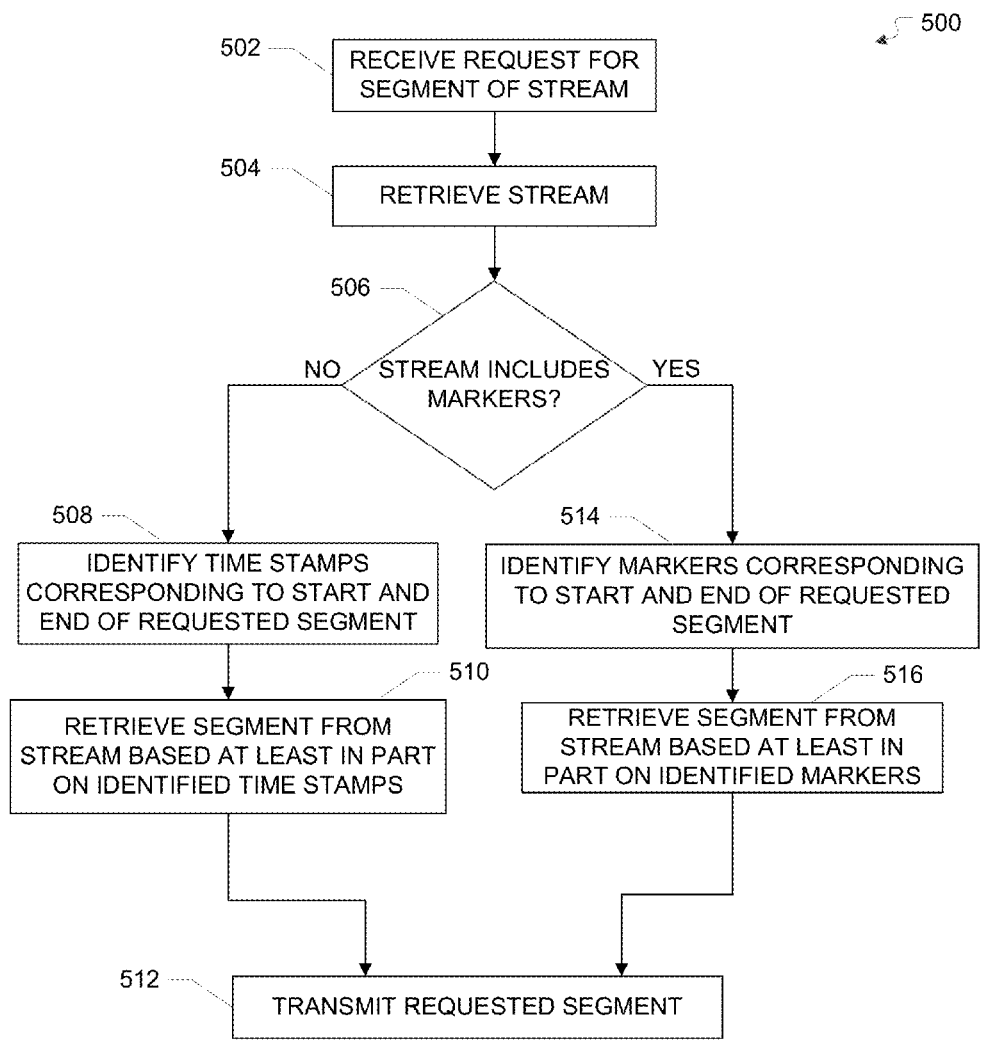
FIG. 5 illustrates a flow diagram of an example process of identifying requested segments in a system for adaptive bit rate distribution of multicast streams in accordance with one or more implementations.

FIG. 5 illustrates a flow diagram of an example process 500 of identifying requested segments in a system for adaptive bit rate distribution of multicast streams in accordance with one or more implementations. For explanatory purposes, the example process 500 is described herein with reference to the gateway device 120 of FIGS. 1-3; however, the example process 500 is not limited to the gateway device of FIGS. 1-3, and the example process 500 may be performed by one or more other components of the gateway device 120. Further for explanatory purposes, the blocks of the example process 500 are described herein as occurring in serial, or linearly. However, multiple blocks of the example process 500 may occur in parallel. In addition, the blocks of the example process 500 need not be performed in the order shown and/or one or more of the blocks of the example process 500 need not be performed.

The gateway device 120 receives a request for a segment of a stream (502), such as from the electronic device 102. The gateway device 120 retrieves the stream (504). The gateway device 120 determines whether the stream includes markers (506), such as markers inserted by the CDN 110. For example, the gateway device 120 may process one or more packets of the stream to determine whether the stream includes markers that can be used to identify segments of the stream. In one or more implementations, the gateway device 120 may receive an indication from the CDN 110, such as in the form of overhead information, that indicates whether the stream includes markers.

If the gateway device 120 determines that the stream includes markers (506), the gateway device 120 identifies the markers in the stream that indicate the start and the end of the requested segment, e.g. the boundaries of the requested segment (514). In one or more implementations, the gateway device 120 may retrieve an association between the requested segment and the markers that form the boundaries of the requested segment from the memory 314. For example, the gateway device 120 may process received packets from the stream, such as packets buffered in the memory 314, to identify whether the marker that indicates the start of the requested segment has been received. If the marker has been received, the gateway device 120 may identify the marker in the memory 314. If the marker has not been received, the gateway device 120 determines when the marker will be transmitted in the stream, e.g. based on the markers already received.

The gateway device 120 retrieves the segment from the stream based at least in part on the determined markers (516). For example, if the gateway device 120 determines that the markers were received and stored in the memory 314, the gateway device 120 retrieves the segment from the memory 314, e.g. gateway device 120 retrieves the packets received between the markers. If the gateway device 120 determines that the markers have not been received, the gateway device 120 retrieves the segment from the corresponding stream when the marker that indicates the start of the segment is received. For example, the gateway device 120 may retrieve the packets that are received after the marker that indicates the start of the segment and before the marker that indicates the end of the segment. If the gateway device 120 determines that the marker that indicates the start of the segment is stored in the memory 314, but not the marker that indicates the end of the segment, the gateway device 120 retrieves packets from the memory 314 that correspond to the segment, and the gateway device 120 retrieves packets from the stream as they are received that correspond to the segment. The gateway device 120 transmits the requested segment to the electronic device 102 (512).

If the gateway device 120 determines that the stream does not include markers (506), the gateway device 120 identifies time stamps, such as presentation time stamps, that indicate the start and the end of the requested segment (508), e.g. the boundaries of the requested segment. For example, the gateway device 120 may retrieve an association between the requested segment and the time stamps that indicate the boundaries of the requested segment from the memory 314. The gateway device 120 may process received packets from the stream to determine whether a packet containing the time stamp that indicates the start of the segment has been received. If a packet containing the time stamp that indicates the start of the segment has been received, the gateway device 120 may identify the packet in the memory 314. If a packet containing the time stamp has not been received, the gateway device 120 determines when the packet will be transmitted in the stream, e.g. based on the time stamps of the packets that have already been received.

The gateway device 120 retrieves the requested segment from the stream based at least in part on the identified time stamps (510). For example, if the gateway device 120 determines that packets containing the time stamps were received and stored in the memory 314, the gateway device 120 retrieves the segment from the memory 314, e.g. the gateway device 120 retrieves the packet containing the time stamp that indicates the start of the segment, the packet containing the time stamp that indicates the end of the segment, and any packets received there-between. If the gateway device 120 determines that a packet containing the time stamp that indicates the start of the segment has not been received, the gateway device 120 retrieves the segment from the corresponding stream when the packet containing the time stamp that indicates the start of the segment is received. For example, the gateway device 120 may retrieve the packet containing the time stamp that indicates the start of the segment, the packet containing the time stamp that indicates the end of the segment, and any packets received there-between. If the gateway device 120 determines that the packet that contains the time stamp that indicates the start of the segment is stored in the memory 314, but not the packet that contains the time stamp that indicates the end of the segment, the gateway device 120 retrieves packets from the memory 314 that correspond to the segment, and the gateway device 120 retrieves packets from the stream as they are received that correspond to the segment. The gateway device 120 transmits the requested segment to the electronic device 102 (512).

Figure 6:
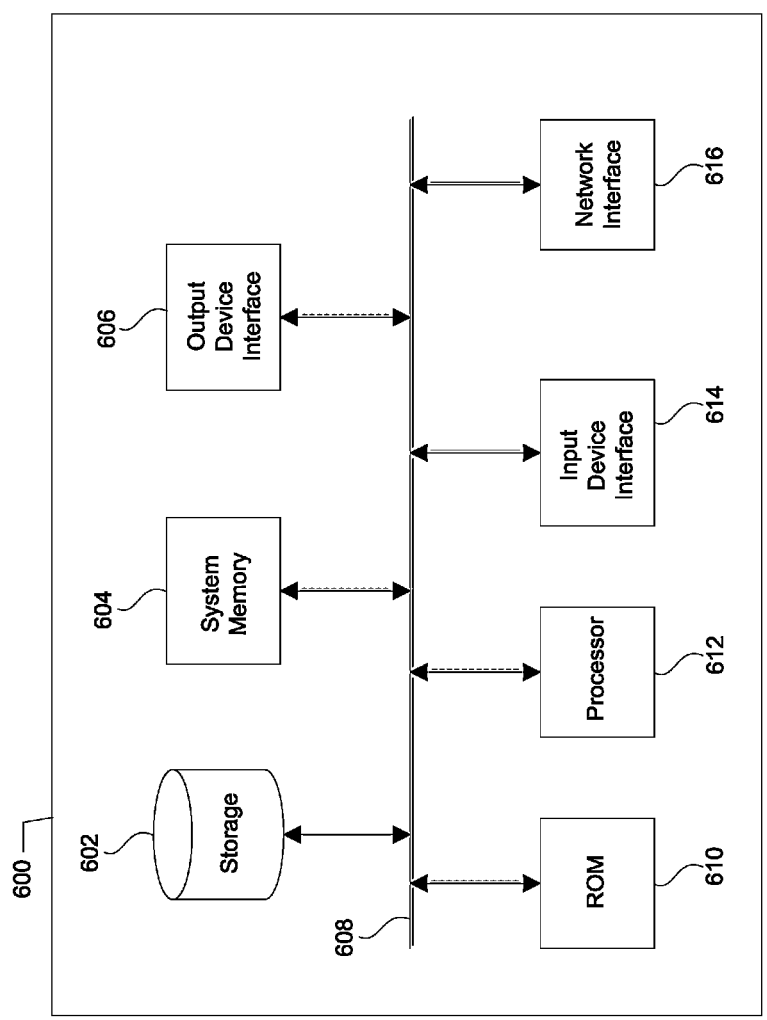
FIG. 6 conceptually illustrates an electronic system with which one or more implementations of the subject technology may be implemented.

FIG. 6 conceptually illustrates an electronic system 600 with which one or more implementations of the subject technology may be implemented. The electronic system 600, for example, can be a desktop computer, a laptop computer, a tablet computer, a server, a switch, a router, a base station, a receiver, a phone, a personal digital assistant (PDA), or generally any electronic device that transmits signals over a network. The electronic system 600 can be, and/or can be a part of, the content server 110, the gateway device 120, and/or one or more of the electronic devices 102, 104, 106. Such an electronic system 600 includes various types of computer readable media and interfaces for various other types of computer readable media. The electronic system 600 includes a bus 608, one or more processing unit(s) 612, a system memory 604, a read-only memory (ROM) 610, a permanent storage device 602, an input device interface 614, an output device interface 606, and a network interface 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to a network (not shown) through the network interface 616. In this manner, the electronic system 600 can be a part of a network of computers (such as a local area network ("LAN"), a wide area network ("WAN"), or an Intranet, or a network of networks, such as the Internet. Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for adaptive bit rate distribution of multicast streams, the method comprising:
   identifying, by a gateway device of a local area network comprising a user device, a plurality of multicast streams transmitted by a content delivery network that is distinct from the gateway device, each of the plurality of multicast streams comprising a different encoded version of a content item that is encoded at one of a plurality of bit rates;
   generating, by the gateway device, an indication of the plurality of bit rates at which the content item has been encoded, the indication comprising a plurality of network identifiers for accessing the content item at the plurality of bit rates, each of the plurality of network identifiers referencing the gateway device;
   transmitting, by the gateway device and to the user device, the indication of the plurality of bit rates at which the content item has been encoded;
   receiving, by the gateway device, a first request from the user device for a first segment of a first multicast stream of the plurality of multicast streams encoded at a first bit rate of the plurality of bit rates, wherein the first request references one of the plurality of network identifiers;
   retrieving, by the gateway device, the first multicast stream of the plurality of multicast streams that comprises the content item encoded at the first bit rate of the plurality of bit rates without forwarding the first request received from the user device to the content delivery network;
   identifying, by the gateway device, a first marker of a first plurality of markers within the first multicast stream of the plurality of multicast streams, the first marker of the first plurality of markers indicating a start of the first segment of the content item within the first multicast stream of the plurality of multicast streams; and
   transmitting, by the gateway device, the first segment of the first multicast stream of the plurality of multicast streams encoded at the first bit rate of the plurality of bit rates to the user device.

2. The method of claim 1, further comprising:
   receiving a second request from the user device for a second segment of a second multicast stream of the plurality of multicast streams encoded at a second bit rate of the plurality of bit rates, the second bit rate being different than the first bit rate;
   retrieving the second multicast stream of the plurality of multicast streams that comprises the content item encoded at the second bit rate of the plurality of bit rates;
   determining a second marker of a second plurality of markers of the second multicast stream of the plurality of multicast streams, the second marker of the second plurality of markers indicating a start of the second segment of the content item within the second multicast stream of the plurality of multicast streams; and
   upon completing the transmitting of the first segment of the first multicast stream of the plurality of multicast streams encoded at the first bit rate of the plurality of bit rates to the user device, transmitting the second segment of the second multicast stream of the plurality of multicast streams encoded at the second bit rate of the plurality of bit rates to the user device.

3. The method of claim 2, wherein a first placement of the first plurality of markers within the first multicast stream of the plurality of multicast streams follows, relative to the content item, a second placement of the second plurality of markers within the second multicast stream of the plurality of multicast streams.

4. The method of claim 2, wherein the indication of the plurality of bit rates at which the content item has been encoded comprises a manifest file that further indicates the plurality of bit rates at which each of a plurality of segments of the content item has been encoded, the plurality of segments comprising the first segment and the second segment.

5. The method of claim 1, wherein the one of the plurality of bit rates at which the content item is encoded differs for each of the plurality of multicast streams.

6. The method of claim 1, wherein the indication of the plurality of bit rates at which the content item has been encoded comprises a manifest file, and the method further comprising:
   determining a plurality of multiplexed streams being transmitted by the content delivery network, each of the plurality of multiplexed streams comprising the content item that is encoded at one of another plurality of bit rates, wherein the manifest file further indicates the another plurality of bit rates at which the content item has been encoded.

7. The method of claim 6, wherein the plurality of multiplexed streams is being transmitted by the content delivery network via at least one of a coaxial transmission or a satellite transmission.

8. A computer program product comprising instructions stored in a non-transitory computer readable storage medium, the instructions comprising:
   instructions to identify a plurality of streams transmitted by a content delivery network, each of the plurality of streams comprising a different encoded version of a content item that is encoded at one of a plurality of bit rates;
   instructions to determine a plurality of segments of each of the plurality of streams based at least in part on a plurality of time stamps associated with the content item;
   instructions to generate an indication of the plurality of bit rates at which the content item has been encoded, the indication comprising a plurality of network identifiers for accessing the content item at the plurality of bit rates;
   instructions to transmit to a user device, the indication of the plurality of bit rates at which the content item has been encoded;
   instructions to receive a first request from the user device for a first segment of a first stream of the plurality of streams encoded at a first bit rate of the plurality of bit rates;
   instructions to acquire the first stream of the plurality of streams that comprises the content item encoded at the first bit rate of the plurality of bit rates without forwarding the first request received from the user device to the content delivery network;
   instructions to determine the first segment of the first stream of the plurality of streams based at least in part on the plurality of time stamps associated with the content item; and
   instructions to transmit the first segment of the first stream of the plurality of streams encoded at the first bit rate of the plurality of bit rates to the user device.

9. The computer program product of claim 8, wherein the indication further indicates at least some of the plurality of segments of each of the plurality of streams.

10. The computer program product of claim 8, the instructions further comprising:
    instructions to receive a second request from the user device for a second segment of a second stream of the plurality of streams that is encoded at a second bit rate of the plurality of bit rates, the second bit rate being different than the first bit rate;
    instructions to acquire the second stream of the plurality of streams that comprises the content item encoded at the second bit rate of the plurality of bit rates;
    instructions for determining the second segment of the second stream of the plurality of streams based at least in part on the plurality of time stamps associated with the content item; and
    instructions to, upon completing the transmitting of the first segment of the first stream of the plurality of streams encoded at the first bit rate of the plurality of bit rates to the user device, transmit the second segment of the second stream of the plurality of streams encoded at the second bit rate of the plurality of bit rates to the user device.

11. The computer program product of claim 10, wherein the first stream of the plurality of streams comprises a multicast stream transmitted over a network and the second stream of the plurality of streams comprises one of a plurality of multiplexed streams transmitted via a hybrid fiber-coaxial (HFC) transmission or a satellite transmission.

12. The computer program product of claim 10, wherein the one of the plurality of bit rates at which the content item is encoded differs for the first stream of the plurality of streams and the second stream of the plurality of streams.

13. The computer program product of claim 10, wherein the first segment of the first stream of the plurality of streams comprises a same portion of the content item as a first segment of the second stream of the plurality of streams.

14. A gateway device comprising:
    at least one processor circuit configured to:
       identify a plurality of streams transmitted by a content delivery network, each of the plurality of streams comprising a different encoded version of a content item that is encoded at one of a plurality of bit rates;
       determine a plurality of segments of each of the plurality of streams;
       generate an indication of the plurality of bit rates at which the content item has been encoded, the indication comprising a plurality of network identifiers for accessing the content item at the plurality of bit rates, each of the plurality of network identifiers referencing the gateway device;
       transmit to a user device, the indication of the plurality of bit rates at which the content item has been encoded;
       transmit a first segment of a first stream of the plurality of streams encoded at a first bit rate of the plurality of bit rates to the user device in response to a first request therefor; and
       upon completing the transmitting of the first segment of the first stream of the plurality of streams encoded at the first bit rate of the plurality of bit rates, transmit a second segment of a second stream of the plurality of streams that is encoded at a second bit rate of the plurality of bit rates to the user device in response to a second request therefor.

15. The gateway device of claim 14, wherein the at least one processor circuit is further configured to:
    identify segment boundaries of each of the plurality of segments of each of the plurality of streams.

16. The gateway device of claim 15, wherein the at least one processor circuit is further configured to:
    identify the segment boundaries based at least in part on a plurality of time stamps associated with the content item or markers within the plurality of streams.

17. The gateway device of claim 16, wherein the first stream of the plurality of streams comprises a multicast stream transmitted over a network and the second stream of the plurality of streams comprises one of a plurality of multiplexed streams transmitted via a hybrid fiber-coaxial (HFC) transmission or a satellite transmission.

18. The gateway device of claim 17, wherein the at least one processor circuit is further configured to:
    determine the first segment of the first stream of the plurality of streams based at least in part on the plurality of time stamps associated with the content item; and
    determine the second segment of the second stream of the plurality of streams based at least in part on the markers within the second stream of the plurality of streams.

19. The gateway device of claim 14, wherein the indication comprises a manifest file and the indication further indicates at least some of the segments of the plurality of streams.

20. The gateway device of claim 14, wherein the first segment of the first stream of the plurality of streams and a first segment of the second stream of the plurality of streams comprise a same portion of the content item.

* * * * *